(12) United States Patent
Fassiau et al.

(10) Patent No.: US 7,846,986 B2
(45) Date of Patent: Dec. 7, 2010

(54) METHOD FOR OBTAINING A POLYMER IN A SOLUTION

(75) Inventors: Eric Fassiau, Brussels (BE); Denis Geets, Kraainem (BE)

(73) Assignee: Solvay S.A., Brussels (BE)

( * ) Notice: Subject to any disclaimer, the term of this patent is extended or adjusted under 35 U.S.C. 154(b) by 428 days.

(21) Appl. No.: 10/564,700

(22) PCT Filed: Jul. 14, 2004

(86) PCT No.: PCT/EP2004/051482

§ 371 (c)(1), (2), (4) Date: Mar. 23, 2006

(87) PCT Pub. No.: WO2005/014705

PCT Pub. Date: Feb. 17, 2005

(65) Prior Publication Data

US 2006/0173086 A1    Aug. 3, 2006

(30) Foreign Application Priority Data

Jul. 15, 2003    (FR) .................................. 03 08691

(51) Int. Cl.
*C08J 11/04* (2006.01)
(52) U.S. Cl. .......................... 521/46.5; 521/40; 521/45; 521/46; 528/480; 528/500; 528/502 E; 528/503
(58) Field of Classification Search ............... 521/46.5, 521/40, 48, 48.5, 40.5, 41, 42.5, 46, 42, 45; 252/186.32; 528/500, 272, 480, 481, 491, 528/501, 502 R, 502 E, 503
See application file for complete search history.

(56) References Cited

U.S. PATENT DOCUMENTS

| | | | |
|---|---|---|---|
| 3,772,262 A | | 11/1973 | Clementi |
| 3,933,574 A | * | 1/1976 | Zinoviev et al. .......... 159/16.3 |
| 4,038,219 A | * | 7/1977 | Boehm et al. .............. 521/46.5 |
| 4,071,479 A | * | 1/1978 | Broyde et al. ............. 521/46.5 |
| 4,146,499 A | * | 3/1979 | Rosano ................... 252/186.32 |
| 4,472,291 A | * | 9/1984 | Rosano ................... 252/186.28 |
| 4,668,768 A | * | 5/1987 | Mendiratta et al. .......... 528/493 |
| 6,172,125 B1 | | 1/2001 | Vandenhende et al. |
| 6,235,298 B1 | * | 5/2001 | Naser et al. .................. 424/401 |
| 6,989,404 B2 | * | 1/2006 | Yamamoto et al. ......... 521/46.5 |
| 7,569,658 B2 | | 8/2009 | Vandenhende et al. |
| 2003/0119925 A1 | * | 6/2003 | Vandenhende et al. ........ 521/40 |
| 2005/0010027 A1 | | 1/2005 | Vandenhende et al. |
| 2005/0077640 A1 | | 4/2005 | Fassiau et al. |
| 2006/0194913 A1 | | 8/2006 | Pleska et al. |
| 2008/0047671 A1 | | 2/2008 | Vandenhende |
| 2009/0124715 A1 | | 5/2009 | Vandenhende |
| 2009/0149619 A1 | | 6/2009 | Fassiau et al. |
| 2009/0203868 A1 | | 8/2009 | Fassiau et al. |

FOREIGN PATENT DOCUMENTS

| | | |
|---|---|---|
| EP | 644230 | 3/1995 |
| EP | 0 945 481 | 9/1999 |
| EP | 1 291 382 | 3/2003 |
| FR | 2.078.683 | 11/1971 |
| FR | 2337164 | 7/1977 |
| WO | WO 0066087 A2 * | 11/2000 |
| WO | WO-01/23463 | 4/2001 |
| WO | WO-01/70865 | 9/2001 |
| WO | WO-2005/017010 | 2/2005 |

OTHER PUBLICATIONS

Van Krevelen, D. W., Properties of Polymers, 1990 Edition, pp. 200-202.
Polymer Handbook, J. Brandrup and E. H. Immergut, Editors, 2nd Edition, pp. IV-337 to IV-359.
U.S. Appl. No. 12/063,710, filed Aug. 17, 2006, Fassiau et al.
U.S. Appl. No. 12/677,906, filed Sep. 18, 2008, Leppers et al.

* cited by examiner

*Primary Examiner*—Ling-Siu Choi
*Assistant Examiner*—Frances Tischler
(74) *Attorney, Agent, or Firm*—Connolly Bove Lodge & Hutz LLP

(57) ABSTRACT

Process for recovering at least one polymer in solution in a solvent by precipitation by means of a non-solvent introduced gradually into the solution to form the precipitation medium, whereby:
  in the course of the introduction of the non-solvent into the precipitation medium, there is first a phase separation (into a continuous phase rich in solvent, in which the polymer is dissolved, and into a disperse phase, consisting of droplets rich in non-solvent) and then there is a phase inversion (the continuous phase then becoming the phase rich in non-solvent, and the disperse phase becoming the phase rich in solvent containing the dissolved polymer)
  the non-solvent is initially introduced into the precipitation medium in liquid form only and in a quantity (Q') which is not zero but is less than the quantity (Q) required to bring about the phase inversion, and is subsequently introduced into the precipitation medium at least partly in vapour form.

20 Claims, 1 Drawing Sheet

METHOD FOR OBTAINING A POLYMER IN A SOLUTION

RELATED APPLICATIONS

Figure 1:
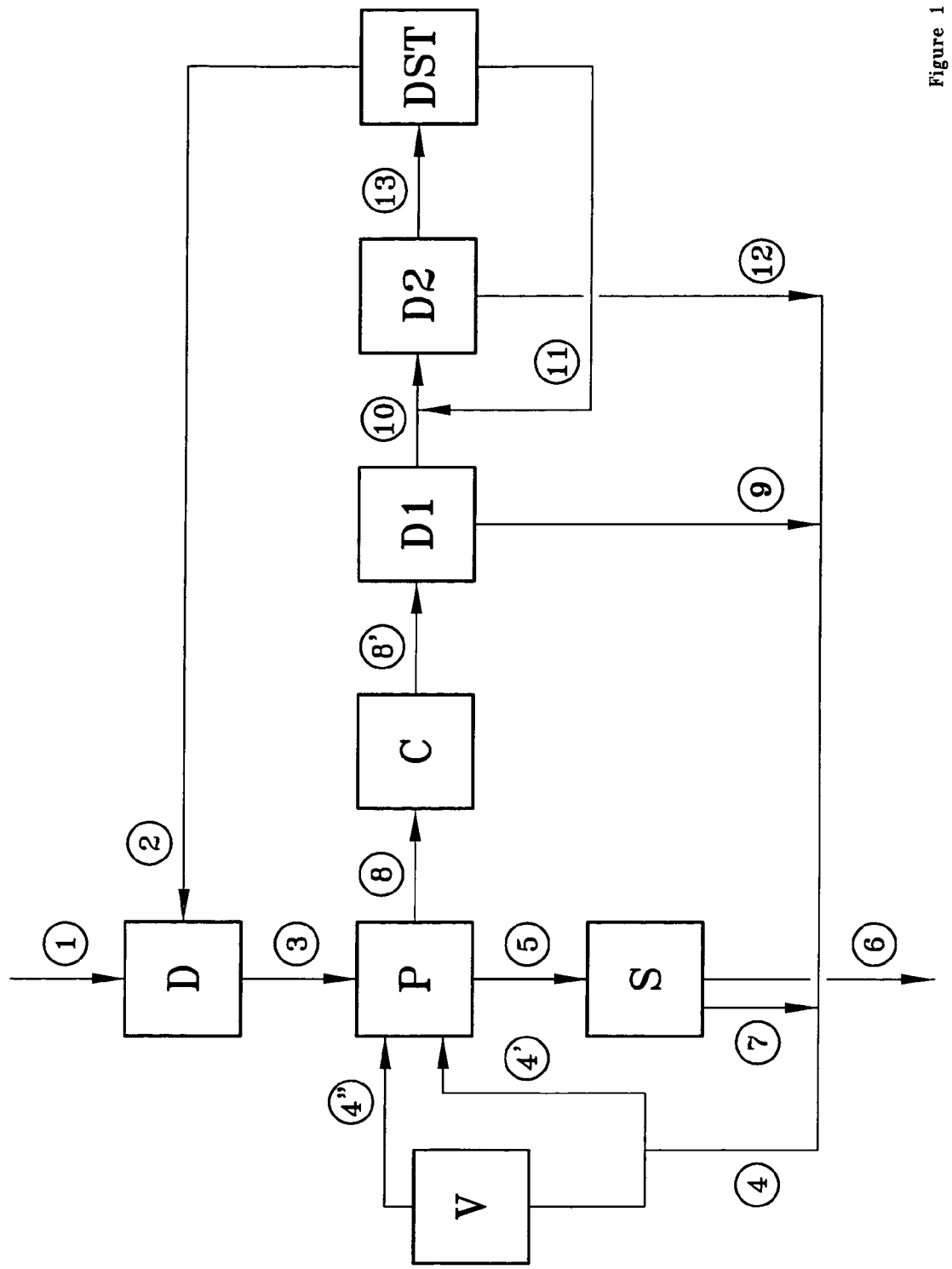

This application is a national stage application (under 35 U.S.C. 371) of PCT/EP2004/051482 filed Jul. 14, 2004 which claims benefit to French application 0308691 filed Jul. 15, 2003.

The present invention relates to a process for recovering a polymer in solution.

Polymers are widely used in a variety of forms, primarily in the solid state. Frequently, however, at a given moment in their existence they are in solution in a solvent, from which they must then be extracted. Polymer solutions are encountered, for example, at the end of certain ("solution") polymerization processes, in the course of certain recycling processes, during the cleaning of certain plants for manufacturing polymer-based articles or paints, etc. These polymers in solution are generally recovered by precipitation with a non-solvent, which may be in liquid form or vapour form or both.

Thus Patent Applications WO 01/23463 and WO 01/70865 in the name of Solvay describe a process for recycling a plastic (PVC or PVDC) by dissolution in a solvent (MEK or methyl ethyl ketone) and by precipitation with a non-solvent (water) both in vapour form (to bring about evaporation of the solvent) and in liquid form (to accelerate the precipitation of the polymer). This process entails a high energy cost, which is linked to the quantity of vapour employed.

The applicant has found that when non-solvent is added gradually this process proceeds generally as follows. As the non-solvent is added to the polymer solution to form the precipitation medium, there first occurs a phase separation: that is, at a given moment, the system changes from a single-phase medium consisting of a solvent-rich phase containing the dissolved polymer and a small amount of non-solvent to a two-phase medium consisting on the one hand of a continuous, solvent-rich phase in which the polymer is dissolved and on the other hand of a disperse phase consisting of droplets rich in non-solvent. Subsequently, following the addition of a given quantity of non-solvent (which is determined by the phase diagram between solvent and water), there is a phase inversion: that is, the (majority) continuous phase then becomes the water-rich phase, and the disperse phase is then composed of droplets of solvent-rich phase containing the dissolved polymer. The injection of vapour into this medium allows the solvent to be removed substantially by azeotropic distillation.

Surprisingly, although the precipitation of the polymer begins before the aforementioned phase inversion, the morphology of the polymer particles obtained is in fact essentially independent of the steps prior to this inversion and is primarily dependent, in contrast, on the operating conditions during and after the phase inversion. But moving towards the composition at phase inversion by injecting vapour unusefully causes the evaporation of a certain quantity of solvent.

To put it another way, the applicant has found that injecting vapour in fact has a positive effect on the morphology of the polymer particles only during or after the phase inversion, and it is therefore unuseful for the non-solvent to be in vapour form prior to that stage.

The present invention accordingly provides a process for recovering at least one polymer in solution in a solvent by precipitation by means of a non-solvent introduced gradually into the solution to form the precipitation medium, whereby:

in the course of the introduction of the non-solvent into the precipitation medium, there is first a phase separation (into a continuous phase rich in solvent, in which the polymer is dissolved, and into a disperse phase, consisting of droplets rich in non-solvent) and then there is a phase inversion (the continuous phase then becoming the phase rich in non-solvent, and the disperse phase becoming the phase rich in solvent containing the dissolved polymer)

the non-solvent is initially introduced into the precipitation medium in liquid form only and in a quantity (Q') which is not zero but is less than the quantity (Q) required to bring about the phase inversion, and is subsequently introduced into the precipitation medium at least partly in vapour form.

Optimizing the physical form in which the non-solvent is introduced into the solution allows a substantial increase to be obtained in the profitability of the process, without detracting from the quality of the precipitated polymer obtained.

The polymer whose recovery is targeted by the process according to the present invention may be of any kind. It may be a thermoplastic resin or an elastomer, but in any case is a resin that can be dissolved in a solvent and which therefore contains little or no crosslinking. It may be an unused (or virgin) resin, which has not undergone any melt-forming except for possible granulation, or a used resin (production waste or recycled resin). It may be an apolar polymer, such as a polyolefin and, in particular, an ethylene polymer (PE) or a propylene polymer (PP). It may also be a polar polymer such as a halogenated polymer and, in particular, a vinyl chloride polymer (PVC), a vinylidene chloride polymer (PVDC) or a vinylidene fluoride polymer (PVDF), etc.; or an EVOH polymer (a copolymer of ethylene and vinyl alcohol). It may also be a mixture of at least two such polymers of the same kind or of different kind. Good results have been obtained with polar polymers, particularly halogenated polar polymers, and very particularly with PVC. By PVC is meant any homopolymer or copolymer containing at least 50% by weight of vinyl chloride.

The polymer dissolved in the solvent may include one or more customary additives such as plasticizer(s), stabilizer(s), filler(s), pigment(s), etc. The term "compound" is generally used for this type of mixture based on polymer(s) and additive (s). One advantage of the process according to the invention is that it allows these additives to be recovered, i.e. to be coprecipitated with the polymer. Thus, for example, where the polymer is PVC, it may be plasticized PVC containing one or more plasticizers generally at a level of 75% or less, or even 70% or less, or even 65% or less. PVC plasticizers are generally organic esters such as phthalates, adipates, trimellitates, etc., with the greatest use being made of phthalates and, in particular, DOP (dioctyl phthalate). The process according to the invention gives good results in the case of plasticized polymers (and plasticized PVC in particular).

The solvent (substance able to dissolve the polymer) is preferably selected from liquids having a solubility parameter (of which a definition and experimental values appear in "Properties of Polymers", D. W. Van Krevelen, 1990 edition, pp. 200-202, and in "Polymer Handbook", J. Brandrup and E. H. Immergut, editors, second edition, p. IV-337 to IV-359) close to that of the polymer to be dissolved and/or having strong interactions with said polymer (hydrogen bonding for instance). The term "close to" generally means "not differing by more than 6 units". The solvent is generally an organic solvent, preferably a polar solvent such as MEK (methyl ethyl ketone), which gives good results with a large number of polymers and, in particular, with halogenated polymers such as PVC. The non-solvent for its part is preferably selected so as to have a solubility parameter which is different from that of the polymer to be dissolved and having no strong interactions with said polymer. The term "different" generally means "differing by more than 6 units". It will be appreciated that the terms solvent and non-solvent refer not only to simple substances but also to mixtures of substances. Inorganic liquids are highly suitable non-solvents, with water being generally the preferred non-solvent (in the case of polymers which are not water-soluble, obviously) in view of the environmental and economic concerns generally involved in industrial processes. Moreover, water has the advantage of forming an azeotrope with certain polar solvents such as MEK, which makes it easier to remove the solvent by azeotropic distillation.

The outcome of the above is that in the process according to the invention the polymer is preferably PVC, the solvent is preferably MEK and the non-solvent is preferably water.

The solutions that can be treated by the process according to the present invention have a polymer concentration such that their viscosity does not interfere with the proper progress of the process (in particular it is necessary for the non-solvent to be able to be gradually mixed and/or dispersed in the solution in order for the two to be able to interact and for the precipitation to be able to take place effectively). In relation to a process where the non-solvent is added from the start in vapour form to the solution (therefore causing the solvent to evaporate), the process according to the invention makes it possible to work with higher concentrations of polymer in the solution since there is less solvent evaporation. Thus, in the process according to the invention, it is possible generally to work with polymer contents greater than or equal to 100 g per litre of solvent, even 250 g/l and sometimes even 300 g/l. However, this content generally does not exceed 500 g/l, or even 400 g/l. It should be noted that the presence of at least one dispersant during the addition of non-solvent to the solution generally promotes the mixing/dispersing of the non-solvent in the solution and therefore makes it possible, generally, to work with more concentrated polymer solutions. A dispersant is a substance which promotes the dispersion of a discrete phase (which may be formed either of liquid droplets or of solid particles) in another phase, the continuous phase. The said substance generally acts at the interface between the two phases and it prevents the agglomeration of the discrete phase (in other words, it promotes the production of a fine and regular dispersion).

According to the invention, when the polymer is dissolved, non-solvent is introduced into the polymer solution, the non-solvent being in liquid form and in a quantity (Q') which is not zero but is less than the quantity (Q) required to bring about the phase inversion. The quantity (Q), which depends in particular on the nature of the solvent and non-solvent, on the temperature, on the pressure and, in certain cases, on the quantity of dissolved polymer, is easily determined experimentally. All that need be done is to gradually introduce the non-solvent in liquid form into the solution until phase inversion is observed (which is readily identifiable for the person skilled in the art) and to measure the quantity of non-solvent added at this point, which is the quantity Q. Good results have been obtained with a quantity Q' of greater than or equal to 50% (by volume) of the quantity Q, or greater than or equal to 70%, or even to 90%.

The rate at which the quantity Q' of non-solvent in liquid form is introduced generally affects the ASG/average diameter ratio of the polymer particles obtained. Good results have been obtained when the introduction time is greater than or equal to 10 minutes or even several tens of minutes.

According to the invention, when the quantity Q' has been introduced into the precipitation medium, the remaining quantity of non-solvent required to precipitate the polymer is at least partly introduced in vapour form. What is meant by this is that at least one fraction of the flow of non-solvent added to the precipitation medium from this time (and generally continuously) is in vapour form. Advantageously the fraction of vapour in this flow is predominant. Preferably all the non-solvent introduced into the polymer solution after the quantity Q' has been introduced into it is in vapour form.

When the solvent and the non-solvent form an azeotrope, the total quantity of non-solvent introduced in vapour form is preferably sufficient to allow azeotropic distillation of the solvent. With particular preference this amount is sufficient to make the medium after precipitation substantially free from solvent. This way of working is particularly advantageous where the non-solvent is water.

It is not detrimental for the non-solvent introduced into the precipitation medium (either in liquid or vapour form) possibly to contain a minority fraction (in weight) of solvent; this is of interest in so far as (as will be set out below for the recycling processes in particular) a possible downstream step of the process may specifically provide such a source of non-solvent, which can therefore be reused without specific purification. Hence, when the non solvent is water, "water" in fact designates an aqueous medium having a majority weight fraction of water (hence, containing more than 50%, even more than 60% and preferably, more than 70% in weight of water). It is preferably pure water or water containing a minority weight fraction of solvent.

According to one version of the present invention the precipitation medium comprises at least one dispersant. According to an advantageous version the precipitation medium comprises two different dispersants of which one has a greater affinity for the non-solvent (dispersant I) and the other has a greater affinity for the solvent (dispersant II).

According to one particularly advantageous version the time at which these dispersants are introduced is optimized as a function of the progress of the precipitation. Thus it is advantageous for the dispersant having the greater affinity for the non-solvent (dispersant I) to be added to the precipitation medium primarily before phase inversion. For this purpose the said dispersant may be present in the solution before non-solvent is introduced, or may be introduced by the liquid non-solvent introduced initially.

It is likewise advantageous for the dispersant having the higher affinity with respect to the solvent (dispersant II) to be added to the precipitation medium primarily after phase inversion. Optimizing the type and the time of introduction of the dispersants makes it possible to optimize the ASG/average diameter ratio of the particles and hence to obtain a compact powder of small particles.

Generally speaking, when precipitation is at an end, the system present comprises a suspension of polymer particles in a medium which is rich in non-solvent. The weight proportion of solid particles in this suspension may be greater than or equal to 10% without any agglomeration of the said particles. In the presence in particular of dispersants as described above, this proportion may even be greater than or equal to 25% or even 30%. Introducing the non-solvent in liquid form makes it possible to obtain more economically (than with vapour) the quantity of non-solvent required to give a suspension which is sufficiently diluted to avoid problems of particle agglomeration.

The polymer particles present in the suspension are collected by any appropriate means: thermal (evaporation of the solvent, optionally by azeotropic distillation: see above), mechanical (filtration, centrifugation, etc.) or a hybrid form (atomization, for example). In the case of temperature-sensitive polymers (such as PVDC, for example) preference will be given to mechanical methods. The particles collected may then be washed, dried and treated by any known means prior to storage, sale and/or use.

The polymer solution to which the present invention is applied may be obtained by any suitable means. However, the dissolving of the polymer in the solvent takes place generally under a pressure at least equal to atmospheric pressure or even at least equal to 1.5 bar. Advantageously this pressure does not exceed 10 bar, preferably 5 bar.

The dissolving temperature is generally at least 75° C. or even 100° C.; generally it does not exceed 125° C. or even 110° C.

In the course of this dissolving it may prove to be advantageous to work in an inert atmosphere, under nitrogen for example, in order to avoid any risk of explosion or of degradation of the solvent and/or of the non-solvent.

During or after the dissolving of the polymer, but before precipitation, it is possible to add one or more additives to the solution. An additive for the purposes of this version of the invention is any organic or inorganic compound not present in the original plastics, or present in a quantity lower than that which is desired. Possible inorganic additives include inorganic pigments, carbon black, metal powders, nanoparticles of various kinds, etc. Possible organic additives include organic pigments, stabilizers, oligomers, plasticizers, etc.

The process according to the present invention can be integrated into any process involving the recovery of a polymer from a solution. In particular it may form part of a process for recycling articles based on polymer(s). The present invention accordingly likewise provides a process for recycling at least one article based on at least one polymer, whereby a) if necessary, the article is shredded into fragments with an average size of 1 cm to 50 cm
b) the article or the article fragments is or are contacted with a solvent able to dissolve the polymer
c) the polymer in solution is recovered using the process described above.

The articles in question may be single-layer or multi-layer solids of any form (sheet, plate, tube, etc.); they may include a number of polymers (only one of which, generally, will then be dissolved selectively, although the article may likewise serve for the manufacture of an alloy) and also non-polymeric materials (reinforcements, fixings, etc.) which will then be removed before the solution is treated by the process described above.

It should be noted that, in the case of articles based on a number of polymers, it may prove advantageous to remove the other (or one of the other) polymer(s) before dissolving the polymer it is desired to recover. Thus, for example, if the solvent selected is able to dissolve a number of the polymers in the article, it may prove advantageous first to eliminate the interfering polymer, for example by means of another solvent, which does not dissolve the polymer to be recovered. It should be noted that, when one of the polymers is semi-crystalline, its solubility may be lowered by an afterbake (that is, residence at a temperature and for a time suitable for obtaining maximum crystallization). An example of such polymers is given by PVC (an amorphous polymer) and PVDC (a semi-crystalline polymer). Thus, for example, an afterbake treatment (lasting for 1 h at 70° C. or for 2 days at 40° C., for example) on a PVC/PVDC complex makes it possible to render the complex insoluble in MEK at 50° C. and hence to dissolve the PVC selectively in MEK at 50° C. (or even at 75° C.) and to apply the process as described above to the resulting solution. It should also be noted that the composition of the solvent may be adapted in order to dissolve certain polymers of a structure selectively.

In the recycling process described above, the conditions (pressure, temperature, stirring, etc.) in which the polymer is dissolved and in which, optionally, non-polymeric elements or elements based on an interfering polymer are separated before precipitation (by filtration, prior dissolution, etc.) will be optimized by any means known to the person skilled in the art. Teaching useful for this purpose is given in Applications EP 945481, WO 01/23463 and WO 01/70865 in the name of Solvay, and is incorporated by reference into the present application.

A recycling process of this kind has been successfully applied to articles comprising PVC.

A major advantage of such a recycling process is that it is able to function in a closed loop (either continuously or batchwise, but with quasi-total recirculation of the liquid phase, with the exception of losses due in particular to adsorption on the polymer particles obtained), without generating refuse. Indeed, the liquid medium obtained after precipitation and separation of the polymer particles, which consists primarily of non-solvent (possibly containing the dispersants), may be recycled, where appropriate by means of appropriate treatment. This treatment may consist in one or more distillations, flocculations, decantations, washings, etc., and in combinations of these treatments. Similarly, when the solvent has been removed from the precipitation medium by azeotropic distillation with the non-solvent, the vapours resulting from this distillation may be condensed and may constitute a liquid phase which can be treated as described above. This treatment preferably includes at least one decantation and, in that case, it is advantageous for the said decantation to proceed at least partly in the presence of a phase separation agent. Thus where two or more decantations take place (in parallel or in series) it is advantageous for at least one of them to take place in the presence of a phase separation agent. A phase separation agent is a substance which promotes the decantation (in other words, the formation of two phases one rich in solvent, the other rich in non-solvent) of the condensed vapours from the azeotropic distillation.

It should be noted, however, that the applicant has found that the presence of a phase separation agent in the precipitation medium (as recommended in application WO 01/70865) at the time of phase inversion and thereafter (that is, during the steps which determine the morphology of the polymer particles) generally had an adverse effect on the said morphology. Moreover, in the case of a closed loop process utilizing a phase separation agent, it is advantageous for the solution of polymer to be precipitated to be substantially free of phase separation agent (that is, to contain not more than a few % by weight thereof). However, the presence of this phase separation agent during the above mentioned decantation treatments is favourable. Consequently, according to one particularly advantageous version of the recycling process as described above, the said process is a closed loop process in which the solvent and the non-solvent are regenerated at least in part by decantation, and in which a phase separation agent is present at least in part during the said decantation but is absent during the precipitation of the polymer. For this to be so, the agent is substantially removed from the liquid medium (primarily solvent) before the polymer is precipitated and the agent is added again to the liquid medium (media) obtained from the precipitation before or during its(their) decantation. The phase separation agent may be removed by any means known for this purpose; distillation provides good results when the boiling point of this agent is substantially different from that of the solvent and of the non-solvent.

One such variant is illustrated non-limitatively by FIG. 1, which represents diagrammatically a specific recycling process applied to PVC.

In this process, PVC in particulate form (1) and a solvent primarily containing MEK (2) are introduced at the dissolving step (D). This gives a solution of PVC (3) which is introduced in the precipitation step (P) together with a non-solvent primarily containing water (4). This non-solvent is introduced in the precipitation step (P) first of all in solely liquid form (4') and subsequently, by means of a vaporization (V), in vapour form (4"). The flow rate (4') is calculated in order to inject into the precipitation (P) a quantity of water Q' which is less than the quantity Q required to bring about the phase inversion. The flow rate (4") for its part is calculated in order to allow complete precipitation of the PVC and complete removal of the MEK from the precipitation medium by azeotropic distillation. At the end of the precipitation step (P) the media present comprise
- on the one hand, a suspension of PVC in water (5), which is subjected to a solids/liquids separation (S) to give particles of PVC (6) and water (7)
- on the other hand, vapours obtained from the azeotropic distillation of water/MEK (8).

These vapours (8) are subjected to condensation (C) to form an unstable liquid (8') which is subjected to decantation (D1), at the end of which a water-rich phase (9) and an MEK-rich phase (10) are obtained. This latter phase (10) is in turn subjected to decantation (D2) in the presence of hexane (11) to give a water-rich phase (12) and an MEK-rich phase (13) containing hexane and a little water.

The water-rich phase (12) is combined with the water (7) obtained from the separation step (S) and with the water-rich phase (9) obtained from the decantation (D1) in order to form the flow of water (4) used for the precipitation (P). The MEK-rich phase (13) is subjected to a distillation (DST) which makes it possible on the one hand to regenerate the hexane (11), which is recycled to the decantation (D2), and, on the other hand, to obtain MEK, which now contains no more than a few % of water and hexane, and which constitutes the solvent (2) used for the dissolving (D). The fact that this solvent contains a small amount of hexane is not a problem since, although this hexane is present at the precipitation step (P), it is removed from the medium before the phase inversion (since the quantity of liquid water Q' is less than the quantity of water Q required for phase inversion, this quantity Q is attained by injecting steam, which has the effect of evaporating the hexane, the more volatile compound of the water/MEK/hexane mixture).

In the process according to FIG. 1 the phase separation agent is substantially removed from the liquid medium obtained from the decantation (D2). This way of working makes it possible, through the use of a solvent buffer (that is, a "double" of the solvent which is in treatment (decantation/distillation) while a manufacturing cycle takes place, and which is used during the following cycle, while the used solvent from the preceding cycle is treated in its turn), not to prolong the duration of the manufacturing cycles (or batches). Alternatively the phase separation agent may be removed between the dissolving step (D) and the precipitation step (P). This alternative, however, is less advantageous, because
- distilling the polymer solution may affect the morphology of the polymer particles that will be obtained
- the cycle time (duration of one batch) is prolonged, since the use of a solvent buffer is not possible.

The advantage of the first alternative may be extended more generally to any recycling process as described above provided that it operates in a closed loop with at least partial regeneration of the solvent and of the non-solvent by decantation in the presence (at least in part) of a phase separation agent, that the phase separation agent has a greater affinity for the solvent than for the non-solvent, and that it is substantially removed from the solvent before the polymer is dissolved. By "substantially removed" is meant that at most a few % (by weight) of phase separation agent may be left in the solvent and/or the non-solvent.

The present invention is also illustrated non-limitatively by the following examples Preliminary Test: Determining the Quantity Q Liquid water was added gradually to PVC solutions at various concentrations, temperatures and pressures and it was observed that the phase inversion took place in each case when the quantity of water was approximately equivalent (by volume) to the quantity of MEK employed.

REFERENCE EXAMPLE 1 AND EXAMPLES 2 TO 4

In Accordance with the Invention

In each of these tests 333 g of plasticized PVC (PVC of Kw 71 with 25% by weight of DOP (dioctyl phthalate)) were dissolved (in one hour at 75° C. under atmospheric pressure and with a helical stirrer rotating at 250 revolutions/minute) in a given quantity of solvent (S) which is either MEK (M) in pure form or a solvent containing MEK, water and hexane (WH:) in quantities which are a function of the target concentration (see table below).

These solutions were then brought to 50-55° C., the pressure was reduced to 600 mbar and liquid water was introduced in a given quantity (Q'<Q) and with a given introduction time (t). Thereafter vapour was injected at a rate of 3.6 kg/h in a quantity (Q") at least sufficient to bring about total precipitation of the PVC.

The solvent was recovered by condensation, for re-use. The PVC compound collected was in suspension in water. It was filtered on a 125 μm metal filter and was subsequently dried in an oven under vacuum (0.2 bara) at 80° C. for 5 hours. The powder of precipitated PVC compound was subsequently screened on a 1 mm sieve before use, and thereafter its ASG and its average diameter were measured and the ASG/average diameter ratio was calculated, which constitutes an indicator of the quality of the PVC particles obtained.

The detail of these tests and the results obtained are given in Table 1.

It is observed that
- despite the injection of a quantity of vapour significantly less than in reference example R1, the examples in accordance with the invention allow particles of similar or even greater quality to be obtained
- an introduction time of the order of 10 minutes for the starting liquid allows particles to be obtained whose quality is better than for a time of 2 minutes (Example 3 relative to Example 2).

EXAMPLES 5 To 8

In Accordance with the Invention

The procedure of Examples 1 to 4 was repeated but on a larger scale and with the quantities of PVC dissolved being varied in order to give the weight concentrations which feature in Table 1, which also contains the detail of the tests and the results obtained.

In test 7 a less plasticized PVC was used (PVC of Kw 71 containing 20% by weight of DOP).

It is observed that:
- the increase in the plasticizer concentration has an adverse effect on the quality of the PVC particles obtained (Example 6 relative to Example 7)
- the presence of hexane at the time of phase inversion also has an adverse effect on the quality of the PVC particles obtained (Example 8 relative to Example 5).

| Ex. | S (kg) | S(l) = Q | Type of S | [PVC]$_{sol}$ (wt. %) | Q' (l) | Q'/Q | T (min) | Q" (l)* | ASG (g/cm$^3$) | Dav (μm) | ASG/Dav |
|---|---|---|---|---|---|---|---|---|---|---|---|
| R1 | 3330 | 4.16 | MWH | 9.1 | 0 | 0 | — | 1.50 | 458 | 503 | 0.9 |
| 2 | 2220 | 2.8 | M | 15 | 1.5 | 0.54 | 2 | 0.50 | 399 | 384 | 1.0 |
| 3 | 2220 | 2.8 | M | 13 | 1.5 | 0.54 | 10 | 0.50 | 519 | 339 | 1.5 |
| 4 | 1665 | 2.1 | M | 17 | 1.5 | 0.71 | 10 | 1.00 | 541 | 303 | 1.8 |
| 5 | 160 | 200 | M | 17 | 100 | 0.50 | 30 | 140 | 677 | 375 | 1.8 |
| 6 | 130 | 163 | M | 20 | 100 | 0.61 | 30 | 110 | 659 | 379 | 1.7 |
| 7 | 130 | 163 | M | 20 | 100 | 0.61 | 30 | 140 | 728 | 224 | 3.25 |
| 8 | 160 | 200 | MWH | 17 | 100 | 0.50 | 30 | 140 | 625 | 501 | 1.25 |

The invention claimed is:

1. A process for recovering at least one polymer in solution in a solvent which comprises consists essentially of precipitating by means of a non-solvent introduced gradually into the solution to form the precipitation medium, wherein:

in the course of the introduction of the non-solvent into the precipitation medium, there is first a phase separation (into a continuous phase rich in solvent, in which the polymer is dissolved, and into a disperse phase, consisting of droplets rich in non-solvent) and then there is a phase inversion (the continuous phase then becoming the phase rich in non-solvent, and the disperse phase becoming the phase rich in solvent containing the dissolved polymer)

the non-solvent is initially introduced into the precipitation medium in liquid form only and in a quantity (Q') which is not zero but is less than the quantity (Q) required to bring about the phase inversion, and the remaining quantity of non-solvent is subsequently introduced into the precipitation medium as a flow in which the vapor fraction is predominant, when a phase separation agent is used in the precipitation medium, the solution of polymer to be precipitated is substantially free of this phase separation agent at the time of phase inversion.

2. The process according to claim 1, wherein the polymer is PVC, the solvent is MEK (methyl ethyl ketone) and the non-solvent is water.

3. The process according to claim 1, wherein the quantity Q' is greater than or equal to 50% (by volume) of the quantity Q.

4. The process according to claim 1, wherein the introduction time of the quantity Q' into the precipitation medium is greater than or equal to 10 minutes.

5. The process according to claim 1, wherein all the non-solvent introduced into the precipitation medium after the quantity Q' has been introduced into it is in vapor form.

6. The process according to claim 1, wherein the solvent and the non-solvent form an azeotrope and the total quantity of non-solvent introduced in vapor form is sufficient to allow the azeotropic distillation of the solvent.

7. The process according to claim 6, wherein the precipitation medium comprises two different dispersants of which one has a greater affinity for the non-solvent (dispersant I) and the other has a greater affinity for the solvent (dispersant II).

8. A process for recycling at least one article based on at least one polymer which comprises:
   a) optionally shredding the article into fragments with an average size of 1 cm to 50 cm,
   b) contacting the article or the article fragments with a solvent able to dissolve the polymer and
   c) recovering the polymer in solution using a process according to claim 1.

9. The process of recycling according to claim 8, which is a closed loop process in which the solvent and the non-solvent are regenerated at least in part by decantation, and wherein a phase separation agent is present at least in part during the said decantation but is substantially absent during the precipitation of the polymer.

10. The process according to claim 9, wherein the phase separation agent has a greater affinity for the solvent than for the non-solvent and is substantially removed from the regenerated solvent before the polymer is dissolved.

11. A process for recovering at least one polymer in solution in a solvent which consists essentially of precipitating by means of a non-solvent introduced gradually into the solution to form the precipitation medium, wherein:

in the course of the introduction of the non-solvent into the precipitation medium, there is first a phase separation (into a continuous phase rich in solvent, in which the polymer is dissolved, and into a disperse phase, consisting of droplets rich in non-solvent) and then there is a phase inversion (the continuous phase then becoming the phase rich in non-solvent, and the disperse phase becoming the phase rich in solvent containing the dissolved polymer)

the non-solvent is initially introduced into the precipitation medium in liquid form and in a quantity (Q') which is not zero but is less than the quantity (Q) required to bring about the phase inversion, and the remaining quantity of non-solvent is subsequently introduced into the precipitation medium as predominately a vapor flow, when a phase separation agent is used in the precipitation medium, the solution of polymer to be precipitated is substantially free of this phase separation agent at the time of phase inversion.

12. The process according to claim 11, wherein the polymer is PVC, the solvent is MEK (methyl ethyl ketone) and the non-solvent is water.

13. The process according to claim 11, wherein the quantity Q' is greater than or equal to 50% (by volume) of the quantity Q.

14. The process according to claim 11, wherein the introduction time of the quantity Q' into the precipitation medium is greater than or equal to 10 minutes.

15. The process according to claim 11, wherein all the non-solvent introduced into the precipitation medium after the quantity Q' has been introduced into it is in vapor form.

16. The process according to claim 11, wherein the solvent and the non-solvent form an azeotrope and the total quantity of non-solvent introduced in vapor form is sufficient to allow the azeotropic distillation of the solvent.

17. The process according to claim 16, wherein the precipitation medium comprises two different dispersants of which one has a greater affinity for the non-solvent (dispersant I) and the other has a greater affinity for the solvent (dispersant II).

18. A process for recycling at least one article based on at least one polymer which comprises:

a) optionally shredding the article into fragments with an average size of 1 cm to 50 cm, b) contacting the article or the article fragments with a solvent able to dissolve the polymer and c) recovering the polymer in solution using a process according to claim 11.

19. The process of recycling according to claim 18, which is a closed loop process in which the solvent and the non-solvent are regenerated at least in part by decantation, and wherein a phase separation agent is present at least in part during the said decantation but is substantially absent during the precipitation of the polymer.

20. The process according to claim 19, wherein the phase separation agent has a greater affinity for the solvent than for the non-solvent and is substantially removed from the regenerated solvent before the polymer is dissolved.

* * * * *